United States Patent [19]

Sugiyama

[11] Patent Number: 4,675,587
[45] Date of Patent: Jun. 23, 1987

[54] CONTROL CIRCUIT FOR ELECTRIC RECLINING SEAT

[75] Inventor: Hiroshi Sugiyama, Kanagawa, Japan

[73] Assignee: Ikeda Bussan Co., Ltd., Kanagawa, Japan

[21] Appl. No.: 810,563

[22] Filed: Dec. 19, 1985

[30] Foreign Application Priority Data

Feb. 8, 1985 [JP] Japan .................................. 60-23133

[51] Int. Cl.⁴ ............................................. G05B 19/42
[52] U.S. Cl. .................................... 318/568; 318/293; 297/355
[58] Field of Search ........................ 318/293, 295, 568; 297/355

[56] References Cited

U.S. PATENT DOCUMENTS 3,022,454  2/1962  Millis ............................. 318/293 X
3,536,974 10/1970  Beigl et al. .................... 318/293 X
4,124,811 11/1978  Anderson ............................ 318/293

FOREIGN PATENT DOCUMENTS 58-49529  3/1983  Japan .

Primary Examiner—Benjamin Dobeck
Attorney, Agent, or Firm—Schwartz, Jeffery, Schwaab, Mack, Blumenthal & Evans

[57] ABSTRACT

Herein disclosed is a control circuit for controlling operation of electrically operated seat back pivoting device, which includes therein a transistor to control the current when the latter is applied to the motor of the device in a direction to pivot the seat back rearward. With this arrangement, the rearward pivoting movement of the seat back is carried out with small torque.

6 Claims, 3 Drawing Figures

CONTROL CIRCUIT FOR ELECTRIC RECLINING SEAT

BACKGROUND OF THE INVENTION

1. Field of the Invention

The present invention relates in general to an electric reclining seat for automobiles, and more particularly to an electric control circuit for controlling operation of such reclining seat.

2. Description of the Prior Art

Hitherto, various kinds of electrically operated reclining seats have been proposed and put into practical use in the field of automobiles. However, as will be outlined hereinafter, some of the conventional electric reclining seats have drawbacks due to their inherent constructions. That is, the pivoting movement of the seat back relative to the seat cushion is carried out with considerably high torque. Thus, sometimes, the rearward tilting of the seat back induces injury to a passenger who sits behind the seat.

SUMMARY OF THE INVENTION

It is therefore an object of the present invention to provide a safety system for such electric reclining seat.

It is another object of the present invention to provide an improved control circuit for such electric reclining seat, which never induces injury to a rear seat occupant even when the seat back collides againt the occupant during the rearward pivoting movement thereof.

According to the present invention, there is provided a seat which comprises a seat cushion, a seat back, pivoting means arranged between the seat cushion and the seat back so as to achieve a pivoting movement of the seat back relative to the seat cushion, an electric motor incorporated with the pivoting means to pivot through the pivoting means the seat back in a forward or rearward direction when electrically energized, a switch interposed between a battery and the motor and having first and second conditions, the first condition being a condition wherein the current from the battery is applied to the motor to drive the same in one direction to pivot the seat back in one direction, the second condition being a condition wherein the current from the battery is applied to the motor to drive the same in the other direction to pivot the seat back in the other direction, and control means incorporated with the switch in a manner to control the intensity of current applied to the motor when the switch assumes the first condition.

BRIEF DESCRIPTION OF THE DRAWINGS

Other objects and advantages of the present invention will become apparent from the following description when taken in conjunction with the accompanying drawings, in which.

DESCRIPTION OF A CONVENTIONAL ELECTRIC RECLINING SEAT

Prior to describing in detail the present invention, one conventional control circuit for the electrically operated reclining seat will be described with reference to FIGS. 2 and 3 in order to clarify the task of the present invention.

Figure 2:
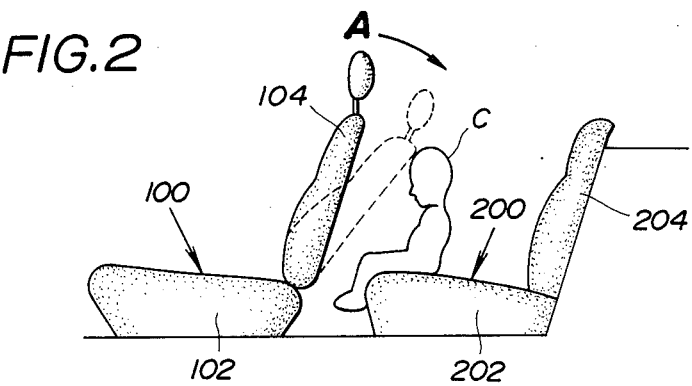
FIG. 2 is a side view showing front and rear seats of an automobile, with a child sitting on the rear seat.

Referring to FIG. 2, there is shown front and rear seats 100 and 200 mounted in an automobile, with a child "C" sitting on the rear seat 200. Each seat 100 or 200 comprises a seat cushion 102 or 202 and a seat back 104 or 204. The front seat 100 is equipped with an electrically operated seat back pivoting device by which the angular position of the seat back 104 relative to the seat cushion 102 is adjustable. The electric seat back pivoting device comprises a known electric motor "M" (see FIG. 3) and a known gear mechanism (not shown) which are incorporated with the seat back 104 in such a manner that under driving of the motor in one direction, the seat back 104 is pivoted rearward, that is, toward the rear seat 200, and under driving of the motor in the other direction, the seat back 104 is pivoted forward, that is, toward the seat cushion 102.

Figure 3:
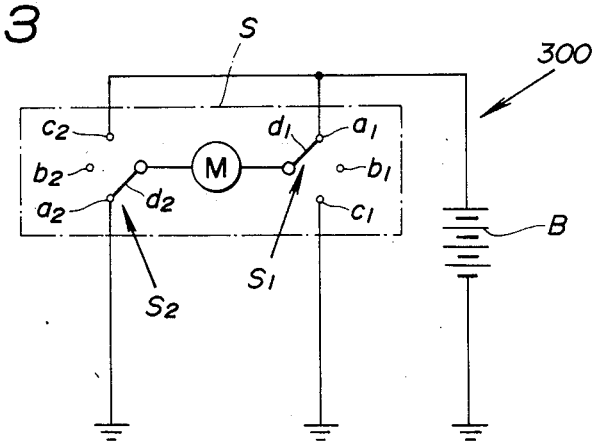
FIG. 3 is a control circuit conventionally used.

In FIG. 3, there is shown a conventional control circuit 300 which is employed in the electric seat back pivoting device for controlling operation of the motor "M". The control circuit 300 comprises a switch "S" which is interposed between a battery "B" (12V, for example) and the electric motor "M". The switch S comprises first and second switch mechanisms $S_1$ and $S_2$, each including three stationary contacts $a_1$, $b_1$ and $c_1$ (or $a_2$, $b_2$ and $c_2$). and one movable contact $d_1$ (or $d_2$). As shown, the stationary contacts $a_1$ and $c_2$ are connected and then extend to a positive terminal of the battery B, while the stationary contacts $c_1$ and $a_2$ are connected and extend through the automotive body to a negative terminal of the battery B. The stationary contacts $b_1$ and $b_2$ are of a neutral contact having no connection with any member. The movable contacts $d_1$ and $d_2$ are connected through the motor "M" and constructed to move synchronously in a manner to carry out "$a_1$–$a_2$" connection, "$b_1$–$b_2$" connection or "$c_1$–$c_2$" connection. When, with the above-mentioned arrangement, the switch S assumes the illustrated condition wherein the movable contacts $d_1$ and $d_2$ contact the stationary contacts $a_1$ and $a_2$ respectively, the current from the battery B flows through the stationary contact $a_1$, the movable contact $d_1$, the motor "M", the movable contact $d_2$ and the stationary contact $a_2$ and returns back to the battery B. During this electric supply to the motor "M", the seat back 104 is pivoted rearward, that is, toward the rear seat 200. When, thereafter, the movable contacts $d_1$ and $d_2$ are switched to the neutral points $b_1$ and $b_2$, the rearward pivoting movement of the seat back 104 stops due to deenergization of the motor "M". When, then, the movable contacts $d_1$ and $d_2$ are shifted to the other stationary contacts $c_1$ and $c_2$, the current from the battery B is applied to the motor "M" from the reversed direction thereby pivoting the seat back 104 forward. Of course, this forward pivoting movement stops when the movable contacts $d_1$ and $d_2$ are shifted to the neutral contacts $b_1$ and $b_2$.

However, the above-mentioned arrangement has the following drawback due to its inherent construction. That is, due to the nature of the control circuit 300, the torque of the motor "M" is considerably high. Thus, if a passenger, for example, a child "C" occupies the rear seat 200 when the seat back 104 is pivoting rearward, there is a high possibility of injuring the child with a corner portion of the seat back 104, as may be understood from the seat back 104 illustrated by broken line in FIG. 2. One attempt to solve this drawback is to put a resistor between the stationary contact $a_2$ and the automotive body. However, this atempt induces not only high electric loss but also dangerous matter wherein the sorrounding of the resistor may burn due to heat generated by the same.

DETAILED DESCRIPTION OF THE INVENTION

Figure 1:
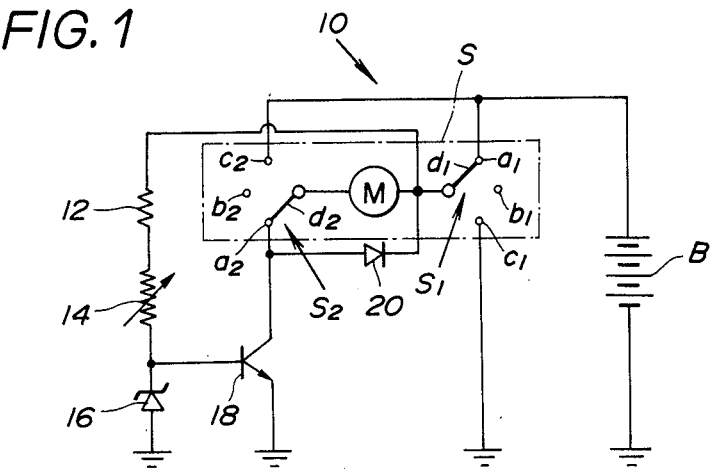
FIG. 1 is a control circuit for controlling operation of an electrically operated reclining seat, which is an embodiment of the present invention.

Referring to FIG. 1, there is shown an improved control circuit according to the present invention, which is free of the above-mentioned drawbacks.

The control circuit 10 of the invention comprises a switch S which includes, similar to the above-mentioned switch of FIG. 3, first and second groups of switch mechanisms $S_1$ and $S_2$. Each mechanism has three stationary contacts $a_1$, $b_1$ and $c_1$ (or $a_2$, $b_2$ and $c_2$) and one movable contact $d_1$ (or $d_2$). The stationary contacts $a_1$ and $c_2$ are connected and then extend to the positive terminal of the battery B. The movable contacts $d_1$ and $d_2$ are connected through the motor "M" and constructed to move synchronously in a manner to carry out "$a_1$-$a_2$" connection, "$b_1$-$b_2$" connection or "$c_1$-$c_2$" connection. The stationary contact $c_1$ is connected to the automotive body to which the negative terminal of the battery B is connected. The movable contact $d_1$ is connected to a fixed resistor 12 which is, in turn, connected to a variable resistor 14. The variable resistor 14 is connected to a Zener diode 16 which, in turn, is connected to the automotive body. A N-P-N type transistor 18 is arranged with its base connected to the line extending between the variable resistor 14 and the diode 16. The collector of the transistor 18 is connected to the stationary contact $a_2$ of the switch S. Arranged between the stationary contact $a_2$ and the movable contact $d_1$ is a diode 20 which functions to protect the transistor 18. The emitter of the transistor 18 is connected to the automotive body.

When, in operation, the switch S assumes the illustrated first condition wherein the movable contacts $d_1$ and $d_2$ contact the stationary contacts $a_1$ and $a_2$ respectively, desirable rearward pivoting of the seat back 104 is carried out in a manner as will be described hereinafter. When the movable contacts $d_1$ and $d_2$ are shifted to the neutral contacts $b_1$ and $b_2$, the pivoting movement of the seat back 104 stops due to deenergization of the motor "M". When, thereafter, the movable contacts $d_1$ and $d_2$ are shifted to the other stationary contacts $c_1$ and $c_2$ respectively due to shifting of the switch 5 to its second condition, the current from the battery B flows through the stationary contact $c_2$, the movable contact $d_2$, the motor "M", the movable contact $d_1$ and the stationary contact $c_1$ and returns back to the battery B through the automotive body. Under this condition, the seat back 104 is pivoted forward with considerable torque in substantially the same manner as is mentioined hereinafore.

The rearward pivoting of the seat back 104 will be described in detail hereinnext.

When the switch S assumes the illustrated first condition, a first series circuit including the battery B, the motor "M", the collector and the emitter of the transistor 18 is established, and at the same time, a second series circuit including the battery B, the movable contact $d_1$, the fixed resistor 12 and the variable resistor 14 and the base of the transistor 18 is established. Thus, in this condition, the collector and the emitter of the transistor 18 are electrically connected, so that current from the battery B is applied to the motor "M" to pivot the seat back 104 rearward. It is to be noted that manipulating the variable resistor 14 varies the base current of the transistor 18 and thus varies the current flowing through the above-mentioned first series circuit. Thus, the speed of the motor "M" can be adjusted by manipulating the variable resistor 14. The Zener diode 16 controls the base voltage of the transistor 18 so as to limit the upper value of the current which flows in the first series circuit. Preferably, the Zener voltage of the Zener diode 16 is controlled to about 2 volts when the battery B is of 12 volt type. Thus, the rearward pivoting of the seat back 104 can be carried out with small current applied to the motor "M". That is, the rearward pivoting of the seat back 104 is carried out with small torque.

Thus, even when the seat back 104 collides against a rear seat occupant "C" during its rearward pivoting, injury of the occupant never occurs. That is, upon collision, the pivoting movement of the seat back 104 stops instantly due to small torque of the motor "M". The forward pivoting of the seat back 104, due to the shifting of the switch 5 to its second condition, is carried out with large torque by the reason as mentionied hereinfore.

Due to the nature of the arrangement of the resistors 12 and 14 and the transistor 18, electric consumption of them is small and thus heat generated by them is small. Thus, the dangerous fire of the circuit does not occur.

What is claimed is:

1. A seat comprising:
   a seat cushion;
   a seat back;
   pivoting means arranged between said seat cushion and said seat back so as to achieve a pivoting movement of said seat back relative to said seat cushion;
   an electric motor incorporated with said pivoting means to pivot through said pivoting means said seat back in forward or rearward direction when electrically energized;
   a switch interposed between a battery and said motor and having first and second conditions, said first condition being a condition wherein the current from said battery is applied to said motor to drive the same in one direction to pivot the seat back in one direction, said second condition being a condition wherein the current from said battery is applied to said motor to drive the same in the other direction to pivot the seat back in the other direction; and
   control means incorporated with said switch in a manner to control the intensity of current applied to the motor when said switch assumes said first condition
   said control means comprising:
   a fixed resistor, a variable resistor and a Zener diode which are connected in series in this order to form a circuit through which current from the battery flows when said switch assumes said first condition; and
   an N-P-N type transistor the base of which is connected to said circuit between said variable resistor and said Zener diode, the collector of said transistor being connectable to one terminal of said motor through said switch, while the emitter of the transistor being connected to a negative terminal of the battery, wherein when said switch assumes the first condition, said motor and said collector of the transistor are connected to form a circuit through which current from said battery flows.

2. A seat as claimed in claim 1, in which said seat back is pivoted rearward with respect to the seat cushion when said switch assumes said first condition, and said seat back is pivoted forward with respect to the seat cushion when the switch assumes said second condition.

3. A seat as claimed in claim 2, in which said control means further comprises:
   a diode the cathode of which is connected to the other terminal of said motor and the anode of which is connected to the collector of said transistor.

4. A seat as claimed in claim 3, in which said switch comprises first and second groups of switch mechanisms,
   said first group of switch mechanism including first, second and third stationary contacts which are respectively connected to a positive terminal of said battery, a neutral point and a negative terminal of the battery, and a first movable contact connected to the first terminal of said motor;
   said second group of switch mechanism including fourth, fifth and sixth stationary contacts which are respectivly connected to the positive terminal of the battery, a neutral point and said collector of the transistor, and a second movable contact connected to the second terminal of said motor;
   wherein said first and second movable contacts are constructed to move synchronously to carry out through the motor the connection between the first and sixth stationary contacts upon the switch assuming said first condition, and the connection between the second and fifth stationary contacts upon the switch assuming a neutral condition and the connection between said third and fourth stationary contacts upon the switch assuming said second condition.

5. A seat as claimed in claim 4, in which the Zener voltage of said Zener diode is approximately 2 volt when the battery is of 12-volt type.

6. A seat comprising:
   a seat cushion;
   a seat back;
   pivoting means arranged between said seat cushion and said seat back so as to achieve a pivoting movement of said seat back relative to said seat cushion;
   an electric motor incorporated with said pivoting means to pivot through said pivoting means said seat back in forward or rearward direction when electricaly energized;
   a switch interposed between a battery and said motor and having first and second conditions, said first condition being a condition wherein the current from said battery is applied to said motor to drive the same in one direction to pivot the seat back in one direction, said second condition being a condition wherein the current from said battery is applied to said motor to drive the same in the other direction to pivot the seat back in the other direction; and
   control means incorporated with said switch in a manner to control the intensity of current applied to the motor when said switch assumes said first condition,
   said control means comprising:
   a fixed resistor, a variable resistor and a Zener diode which are connected in series in this order to form a circuit through which current from the battery flows when said switch assumes said first condition;
   a N-P-N transistor the base of which is connected to said circuit between said variable resistor and said Zener diode, the collector of said transistor being connectable to one terminal of said motor, while the emitter of said transistor being connected to a negative terminal of the battery; and
   a diode the cathode of which is connected to the other terminal of said motor and the anode of which is connected to the collector of said transistor;
   wherein when said switch assumes the first condition, said motor and said collector of the transistor are connected to form a circuit through which current from the battery flows.

* * * * *